United States Patent

Garland et al.

[11] Patent Number: 5,841,845
[45] Date of Patent: Nov. 24, 1998

[54] DIALING PLAN FOR SPECIAL ACCESS APPLICATIONS SUCH AS TELEMETRY SYSTEMS

[75] Inventors: Stuart Mandel Garland, Morton Grove; David B. Smith, Hinsdale, both of Ill.

[73] Assignee: Lucent Technologies Inc., Murray Hill, N.J.

[21] Appl. No.: 768,823

[22] Filed: Dec. 18, 1996

[51] Int. Cl.$^6$ .................................................. H04M 11/00
[52] U.S. Cl. ..................................... 379/106.01; 379/219
[58] Field of Search ......................... 379/106.01–106.09, 379/106.11, 219

[56] References Cited

U.S. PATENT DOCUMENTS

| | | | |
|---|---|---|---|
| 3,700,816 | 10/1972 | Evans .................................... | 379/106.01 |
| 5,128,988 | 7/1992 | Cowell et al. ....................... | 379/106.03 |
| 5,243,644 | 9/1993 | Garland et al. ..................... | 379/106.09 |
| 5,359,641 | 10/1994 | Schull et al. ........................ | 379/106.09 |
| 5,452,343 | 9/1995 | Garland et al. ..................... | 379/106.03 |
| 5,528,675 | 6/1996 | Chen .................................... | 379/106.01 |
| 5,535,267 | 7/1996 | Schull ...................................... | 379/106 |
| 5,583,923 | 12/1996 | Hoy et al. ................................ | 379/106 |

OTHER PUBLICATIONS

Stephen J. Bigelow, *Understanding Telephone Electronics*, third edition, pp. 1–9, ©1993.

*Primary Examiner*—Wing F. Chan
*Attorney, Agent, or Firm*—John W. Hayes; Dennis J. Williamson

[57] ABSTRACT

A utility meter or other fixed device is assigned a permanent dialed number that is unrelated to the telephone number of the customer premise where the device is located. Instead, the dialed number is permanently assigned to a line termination location in the switch such that when the dialed number is dialed a connection is made to the line terminated at that physical location in the network switching system irrespective of the customer's telephone number. As a result, the number dialed by the calling party is unrelated to the customer's telephone number such that changes in a customer's telephone number do not affect the telemetry system. Moreover, the telemetry number could be selected from a specified range of numbers or could include a predetermined command digit such as *8 prior to the number string. As a result, the switching system is able to identify that the request is for a special service such as telemetry connection by the dialed telemetry number rather than by the trunk on which the call is received. Thus, the availability of the service will not depend on access to specialized trunks.

14 Claims, 2 Drawing Sheets

DIALING PLAN FOR SPECIAL ACCESS APPLICATIONS SUCH AS TELEMETRY SYSTEMS

BACKGROUND OF THE INVENTION

The invention relates, generally, to telecommunication system dialing plans and, more particularly, to a dialing plan for special access applications such as telemetry systems.

It will be appreciated that one application of a typical telemetry system allows a utility to remotely obtain readings from its customers' utility meters via the telecommunications network. Specifically, the utility sends a request for a telemetry connection to a switching system in the network by dialing the telephone number of the customer premise. Using the access method disclosed in U.S. Pat. No. 5,189,694 issued to Garland on Feb. 3, 1993, the trunk connecting the utility to the switching system is dedicated to requests for telemetry service, such that the switching system recognizes the call as a request for a telemetry connection by the trunk over which the request is received. The switching system, based upon the telephone number, establishes a telemetry connection as is known in the art. Once the connection is established, the utility meter at the customer premise sends a data message to the utility including the utility usage registered by that meter or other relevant data. In addition to meter reading application described above, such telemetry systems can also be used for a variety of other data transfer applications.

While such systems efficiently transfer the desired data, a problem exists in that the utility (or other calling entity) must maintain a listing of current telephone numbers of each of its customers (or other called entities). It will be appreciated that customer telephone numbers are volatile in that customers can change their telephone numbers, the network administrator may require a change in customer telephone numbers, a customer may move and retain his or her telephone number (as in local number portability applications), a customer may have an unlisted number or normal telephony service may be denied to a specific DN or the like. In all events, every time a telephone number changes, the utility must be informed of that change and it must update its customer telephone number list to correlate the telephone number with the customer premise meter.

In an attempt to minimize the effect of telephone number changes on the utility, it is known in the art to create a separate data base in which customer telephone numbers are correlated to an arbitrary dialing number where the dialing number is used by the utility when requesting a telemetry connection. The advantage of such a system is that the arbitrary dialing number does not change when a customer's telephone number is changed. As a result, changes in customer telephone numbers are invisible to the utility or other calling entity. The problem remains, however, that the data base must be maintained and updated to ensure that the correlation between the dialing number and the customer's telephone number is accurate. This requires that the data base be updated whenever a telephone number is changed. While this system may free a particular utility from maintaining and updating a telephone number list, it reallocates the problem to the entity responsible for maintaining the data base. Thus, the fundamental problem of correlating volatile customer telephone numbers to utility meters (or other fixed elements) remains the same.

Thus, a system for eliminating the administrative problem resulting from the volatility of telephone numbers in telemetry systems and other special access systems is desired.

SUMMARY OF THE INVENTION

In the dialing plan of the invention a utility meter or other device fixed at a customer premise is assigned a dialing number that is unrelated to the telephone number of the customer premise. Instead, the dialing number is permanently assigned to a physical line termination location or port in the switching system such that when the dialing number is received at the switching system, a connection is made to the line connected to the line termination or port in the switching system irrespective of the customer's telephone number. As a result, the dialing numbers used by the utility or other calling entity are unrelated to the customer telephone numbers such that a change in a customer's telephone number does not affect the calling entity's system. Moreover, the dialing number could be selected from a specified range of numbers and/or could include a predetermined command digit such as *8 prior to the dialing number string. As a result, the switching system is able to identify that the request is for a special access application such as a telemetry connection by the dialed telemetry number rather than defining the special access application by the trunk on which the call is received. Thus, the availability of special access services does not depend on access to specialized dedicated trunks, thereby expanding the availability of special access services such as telemetry.

DETAILED DESCRIPTION

Figure 1:
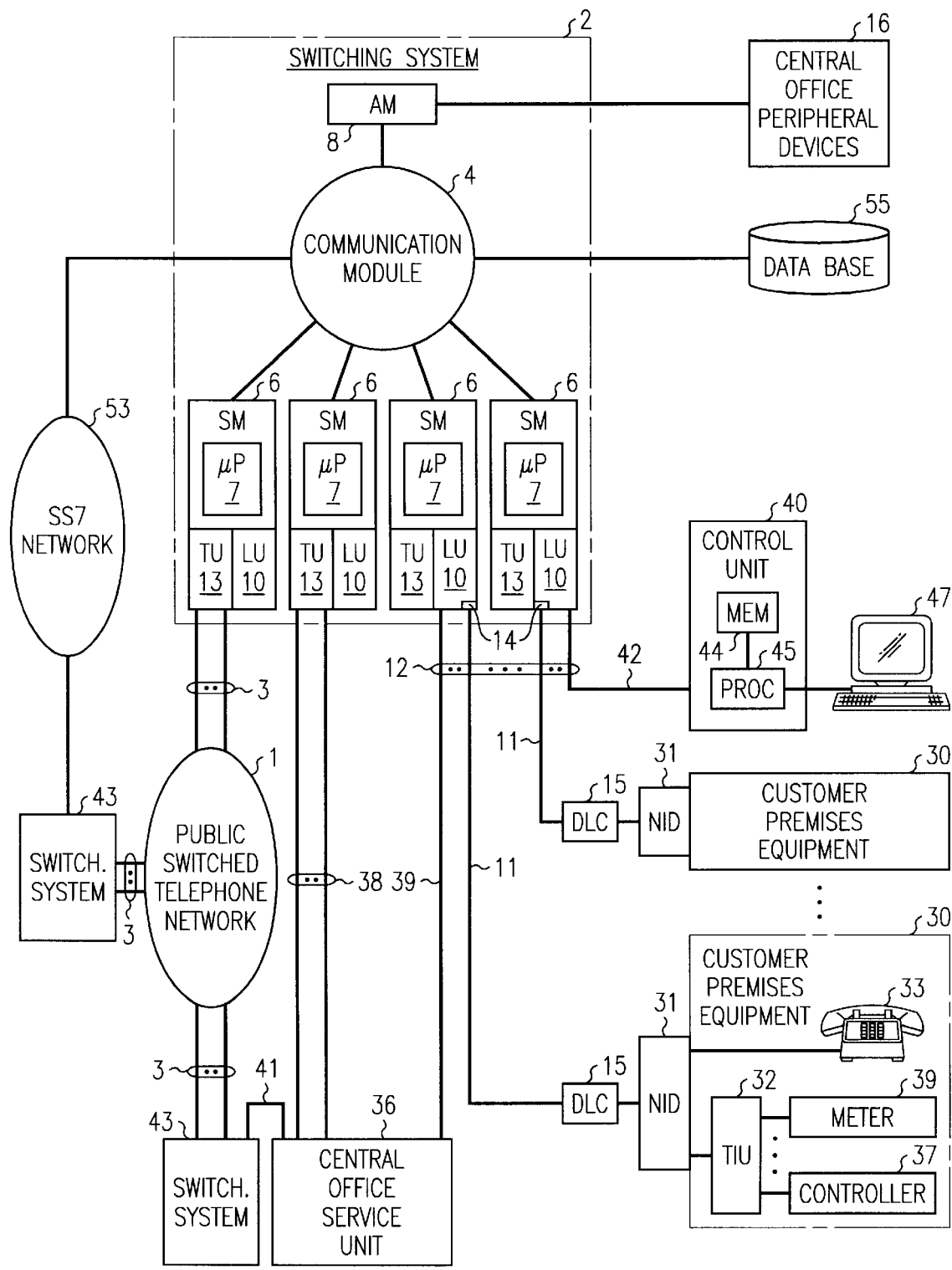
FIG. 1 is a block diagram of a telecommunications system employing the dialing plan of the invention.

The system of the invention is used in a public switched communications network such as is illustrated in FIG. 1 and consists of a plurality of switching systems connected to one another in the public switched network 1 over inter-office trunks 3 as is well understood. Referring to switching system 2, each switching system can consist of one of the family of 5ESS® switches manufactured and sold by Lucent Technologies Inc. and described in U.S. Pat. No. 4,592,048 issued to Beckner et al. on May 27, 1986 and in *AT&T Technical Journal*, Vol. 64, No. 6, Part 2, pp. 1305–1524, or any other similar switching system. Switching system 2 operates as is well known in the art to switch voice and data through the network. The architecture of such a switching system is shown and includes a communication module 4 forming a hub and having a plurality of switch modules (SM) 6, and an administration module (AM) 8 emanating therefrom. Each switch module 6 is controlled by microprocessor 7 and provides call processing, space division switching, and signaling for the lines and trunks to which it is connected. Line units (LU) 10 provide interface to the local loops 12 that connect to the customer premise equipment and trunk units (TU) 13 provide interface to the trunks 3 that connect to other switches in the network. The administration module 8 provides functions that can be centralized such as maintenance control, craft interface, text and data base management, call routing and time slot allocation. The administration module 8 consists of a control unit such as the AT&T 3B21D duplex processor and a main memory. In some switching systems, the administration module is assisted by a separate processor that performs some administrative functions. The administration module 8 also includes an input/output processor providing communication between the switching system 2 and central office peripheral devices 16 such as terminals, printers and the like. Communication module 4 is the hub of the switching system and allows communication between the administration module 8 and the switch modules 6. Communication module 4 consists of a message switch that provides the administration module-to-switch module and switch module-to-switch module message communication, and a time multiplexed switch providing the switch module-to-switch module and switch module-to-administration module time slot connection for voice and data communication and the clock distribution. While the architecture of one particular switching system has been shown and described, it will be understood that any switching system capable of switching voice and/or data can be used.

The local loops 12 typically consisting of a pair of copper wires, coaxial cables, fiber or any similar transmission member defining local lines 11 that connect switch 2 to customer premise equipment (CPE) 30 such as telephones, utility meters, appliances, multimedia equipment, terminals or the like. The local loops may also include digital loop carrier systems (DLC) 15 such as the SLC® series of carriers manufactured and sold by Lucent Technologies Inc. Each line 11 connects to a specific physical line termination or port 14 on the line unit 10 where that line termination or port is defined by the switch module number, line unit number, and port number. Switching systems that have an architecture different from that of the illustrated switching system may use a different numbering scheme to identify the line termination or port but the physical location to which any line is connected is known and identifiable.

Customer lines 11 terminate at network interface devices (NID) 31 that serve as the transition point between the network and the customer premise equipment. The NID may be connected to a telemetry interface unit (TIU) 32 that functions to route a telemetry connection to the appropriate customer device such as utility meter 39, appliance controller 37 or the like. A telephone set 33 is connected directly to the NID 31. Other arrangements of the customer premise equipment are possible. For example, the TIU can be eliminated and the functionality of the TIU be built into the utility meter that is then connected directly to the NTD, if desired. It is to be understood that such a system can support digital or analog transmission.

A calling entity's equipment can consist of a control unit 40 consisting of a processor 45 and memory 44. Control unit 40 is connected to the switching system 2 over a dedicated or dial up line 42. Control unit 40 may include an interface such as a keyboard and monitor 47 as will be understood. The control unit can be operated by a utility or by any service provider having equipment located on the customer premise that can be accessed via the network. Moreover, the specific arrangement of the calling entity's equipment is made by way of example only.

A central office service unit (COSU) 36 is connected to the switch 2 over one or more utility telemetry trunks (UTT) 38 and by a dial up or dedicated line 39 to control unit 40. Moreover, COSU functionality could be integrated into one of the switching systems in the network rather than being a stand alone unit. As will be appreciated, line 42 can be connected to line 39 through the switch fabric of switching system 2 in the same manner as voice and data connections to allow control unit 40 to communicate with COSU 36. As explained in detail in U.S. Pat. No. 5,189,694 issued to Garland on Feb. 23, 1993; U.S. Pat. No. 5,243,644 issued to Garland et al. on Sep. 7, 1993; U.S. Pat. No. 5,394,461 issued to Garland on Feb. 28, 1995; and U.S. Pat. No. 5,327,488 issued to Garland on Jul. 5, 1994, COSU 36 and UTT 38 are used to make a suppressed ringing connection between a first entity having access to the COSU and a second entity. The system of the invention uses the suppressed ringing connection to allow the control unit 40 to cause the COSU to silently alert TIU 32 hosted by switching system 2 such that the control unit 40 and meter communicate with one another without an audible power ringing signal being heard at the customer premise. While such a suppressed ringing connection has previously been used to allow a utility to communicate with a utility meter, the connection has been made in response to the dialing of either the customer premise telephone number or a number that is converted to the customer premise telephone number and then sent to the switching system.

COSU 36 can be connected to more than one switching system as illustrated in FIG. 1 where another UTT41 connects the COSU 36 to additional switching systems 43. Alternatively, a common channel signaling network such as SS7 network 53 can be used to connect COSU 36 to a second switching system 43. As a result, the controlling entity's unit 40 can be connected to TIUs hosted by different switching systems in the network. COSU 36, as is known, creates a one to many connection in which line 39 (which is switch connected to line 42) can be connected to a plurality of UTTs 38 including UTTs contained within a primary rate interface (PRI). In this manner, the COSU serves to multiplex and demultiplex the signals as they are transmitted between line 39 and UTTs 38 that, in turn, are connected to a multiplicity of local lines 11 that connect to CPE 30.

Figure 2:
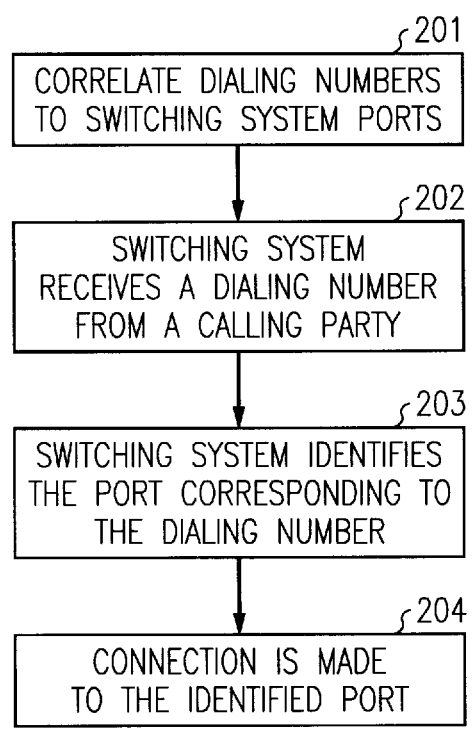
FIG. 2 is a flow chart describing the method of operation of the system of the invention.

Referring to FIG. 2, in order to make the telemetry connection, a data base 55 contains a correlation between the dialing numbers and physical ports on the switching system (block 201). Data base 55 can form part of switching system 2 or can be a centralized data base accessible by a number of switching systems such as an advanced intelligent network (AIN) data base. The string of digits comprising the dialing number can define the port expressly by using the switch module number, line card number and port number as described above. Alternatively, the dialing number can consist of the serial number of the targeted device or arbitrary digits that are translated to the physical port of the desired customer line in data base 55. Where a number such as the device's serial number is used it is necessary to ensure that the dialing number is unique. This can be accomplished by use of a unique prefix or suffix that identifies the device's class, manufacturer or other unique characteristic. In either event the dialing number is not correlated to the customer's telephone number but rather identifies the port hosting the line that is physically connected to the targeted premise. It is to be understood that more than one dialing number can be correlated to a single port where the different dialing numbers are used by different calling parties (e.g. a first dialing number is used by a utility to reach a utility meter and a second dialing number is used by the switching system administrator to perform loop back tests of the local loops hosted by that switching system). It is also contemplated that the dialing number be private, i.e. known only to the appropriate calling party (utility) and the switching system, as opposed to the public directory telephone number, if desired. Thus, any changes that may occur to the telephone number for that customer premise do not affect the number dialed by the utility. The dialing number is only changed if the local line 11 to a customer premise is physically moved to a different port on the switching system. Because such changes are much less frequent than telephone number changes, the system of the invention minimizes number administration. Moreover, where the dialing number is the targeted device's serial number or another number available to the targeted device, the TIU can respond to a query from the switching system with the serial number (or other known number) such that the switching system can automatically update data base 55 by querying the TIUs served by the lines hosted by the switching system. The data base can also be updated by the calling entity providing the necessary information to the switching system. The utility or other calling party makes a request for a connection from control unit 40 by transmitting a dialing number that is received by the switching system 2 (block 202). Unlike with existing telemetry systems, the utility's request for a connection does not include the telephone number of the customer premise. Rather the request for connection includes a string of digits (dialing number) that identifies the line termination or port 14 on switching system 2 to which the customer line to the targeted customer premise is connected. After receiving the dialing number the switching system identifies the targeted port or line termination by reference to the data base 55 (block 203). Once the port is identified, connection is made from the trunk on which the request was received to the identified port without regard to the telephone number of the customer premise at which the line terminates (block 204).

Because the dialing number is not correlated to the customer's telephone number, the dialed number can be selected in such a way that the number defines the type of service request. For example, requests for a suppressed ringing telemetry connection (or any other special service) can be made by dialing an identifying prefix such as *8 and then the dialing number identifying the port. Alternatively, a reserved digit range can be used for the special service request. In all events, because the request for a suppressed ringing connection can be identified by the switch from the dialed number (an identification not possible when the customer's telephone number was used for establishing the suppressed ringing connection) the utility does not have to be connected to the switching system over a line or trunk dedicated to that service. As a result, telemetry calls or other calls that utilize a suppressed ringing connection can be initiated from any station connected to the switching system over any line provided that station subscribes to the desired service.

Other requests for service can also be made via a predetermined prefix digit series. The prefix could be defined as a digit sequence ($X_1 \ldots X_N$) prefixed to the dialing number where each digit defines a parameter for a service request to the switching system. By way of example digit $X_1$ could define the type of service such as query and data retrieval, data download to a display device, command and control messaging, testing or the like; digit $X_2$ could define the class of a targeted CPE and/or telecommunications protocol for a targeted CPE such as visual display only, test device, data store and recovery device or the like; digit $X_3$ could define the transmission as one or two way; digit $X_4$ could define the transmission as on-hook or off-hook; digit $X_5$ could define the priority level of the transmission relative to other calls; digit $X_6$ could define when a telemetry call is to be terminated (i.e. after data transfer) and further digits could define additional parameters. The forgoing parameters have been provided by way of example and other parameters can be defined as determined by the calling entity and switching system. When the dialed number is received at the switching system, the switching system determines if the number contains a special service request, such as a prefix requesting a suppressed ringing connection, and if it does, the switching system initiates the connection and provides the special service. It will be appreciated that the parameters defined by the prefix can be different than the feature set associated with a customer's telephone number for the same customer line.

By establishing a fixed relationship between the dialing number and the physical location, changes on the customer's telephone number do not affect the telemetry service. It is to be understood that while the invention has been described specifically with respect to telemetry meter reading applications, the call handling of the invention includes any special application that requires connectivity to a fixed device or physical location. For example, the dialing plan of the invention also has particular application to loop test systems where the physical loop is tested based on the dialing number of the physical loop-back test device rather than on the telephone number of a customer thereby avoiding the need for the test system to update its data base every time a change occurs in a customer telephone number. It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. In a telecommunications system comprising a switching system connected to customer premise equipment over a plurality of customer lines, said customer lines terminating at ports on the switching system, a method for establishing a connection between a first customer premise equipment and a second customer premise equipment comprising the steps of:

correlating said ports to dialing numbers unrelated to directory numbers assigned to the customer premise equipment;

receiving one of said dialing numbers from said first customer premise equipment at said switching system;

identifying one of said ports correlating to said one of said dialing numbers, and initiating a connection between said first customer premise equipment and said one of said ports.

2. The method according to claim 1, wherein the step of correlating includes the step of assigning a number that identifies the physical location of the port in the switching system.

3. The method according to claim 1, wherein the connection is a suppressed ringing connection.

4. The method according to claim 1, wherein said dialing number defines a request for a special service.

5. The method according to claim 4, wherein the special service is a suppressed ringing connection.

6. The method according to claim 1, wherein the dialing number includes a prefix that defines a request for a special service.

7. The method according to claim 1, wherein the dialing number is within a reserved digit range that defines a request for a special service.

8. The method according to claim 6, wherein the prefix consists of a series of digits defining parameters for controlling the connection.

9. The method according to claim 8, wherein the parameters include the type of service.

10. The method according to claim 8, wherein the parameters include a class of customer premise equipment.

11. The method according to claim 8, wherein the parameters include a transmission protocol to be used by a customer premise equipment.

12. The method according to claim 8, wherein the parameters define transmission techniques.

13. A method for routing calls in a switching system comprising the steps of:

connecting customer lines to ports in the switching system;

correlating each of said ports to one of a plurality of dialing numbers unrelated to directory numbers assigned to the customer premise equipment;

receiving one of said plurality of dialing numbers at said switching system;

identifying one of said ports correlating to said one of said plurality of dialing numbers; and initiating a connection to said one of said ports.

14. A method for initiating a connection between customer premise equipments through a telecommunications switching system, the method comprising the steps of:

providing a plurality of dialing number strings, each of said dialing number strings including:

an identification portion identifying a particular physical line termination; and a supervisory portion defining parameters for controlling the connection;

receiving one of said plurality of dialing number strings at the telecommunications switching system;

interpreting the identification portion of the dialing number string to establish a connection to the physical termination identified;

interpreting the supervisory portion of the dialing number string to establish a type of connection requested.

* * * * *